United States Patent [19]

Antkowiak

[11] Patent Number: 5,111,702
[45] Date of Patent: May 12, 1992

[54] TORSION RING TRANSDUCER

[75] Inventor: Joseph H. Antkowiak, Oxford, Mass.

[73] Assignee: Hottinger Baldwin Measurements, Inc., Marlboro, Mass.

[21] Appl. No.: 543,046

[22] Filed: Jun. 22, 1990

[51] Int. Cl.⁵ .............................................. G01L 1/22
[52] U.S. Cl. ................................. 73/862.65; 338/5
[58] Field of Search ........................ 73/862.65; 338/5

[56] References Cited

U.S. PATENT DOCUMENTS

| | | | |
|---|---|---|---|
| 4,491,028 | 1/1985 | Hatamura | 73/862.65 X |
| 4,811,610 | 3/1989 | Gassmann . | |
| 5,024,107 | 6/1991 | Bethe | 73/862.65 |

FOREIGN PATENT DOCUMENTS

| | | | |
|---|---|---|---|
| 0338325 | 10/1989 | European Pat. Off. | 73/862.65 |
| 3736154 | 5/1989 | Fed. Rep. of Germany | 73/862.65 |

OTHER PUBLICATIONS

Article entitled: "New Developments in Force Measurement" by Joseph H. Antkowiak et al., published by Hottinger Baldwin Measurements, Inc., Marlboro, Mass., 01752.

*Primary Examiner*—Charles A. Ruehl
*Attorney, Agent, or Firm*—W. G. Fasse

[57] ABSTRACT

A torsion ring transducer has a sensing ring mounted in a ring housing by a first ring web between the housing and the sensing ring and by a second ring web between the sensing ring and a central load application body. The ring housing is secured to a mounting base by an isolation device, for example, a ring cylinder having a defined cylinder wall length in the direction of a central transducer axis and a defined cylinder wall thickness in the radial direction. The ring cylinder prevents mounting effects from reaching the sensing ring.

20 Claims, 2 Drawing Sheets

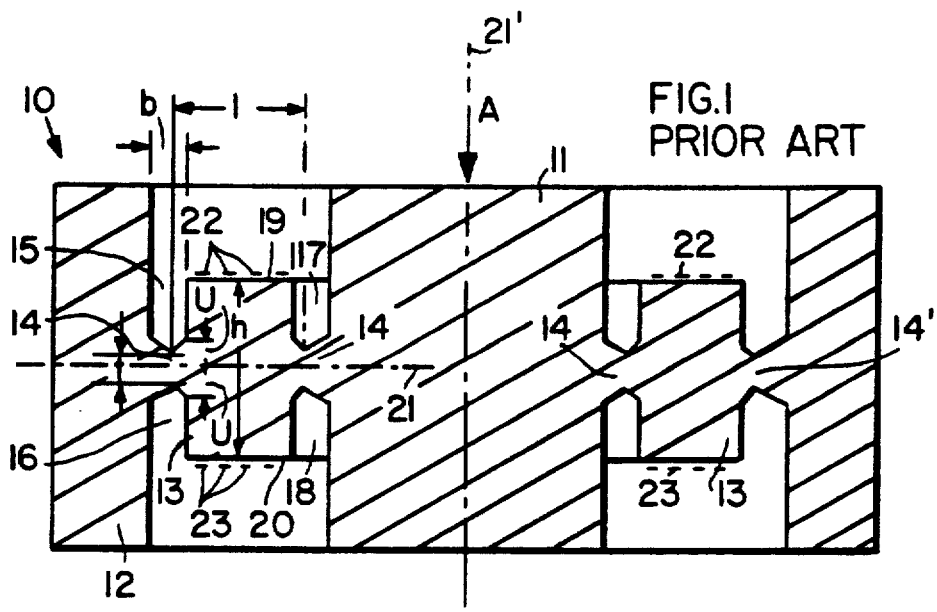
FIG.1 PRIOR ART
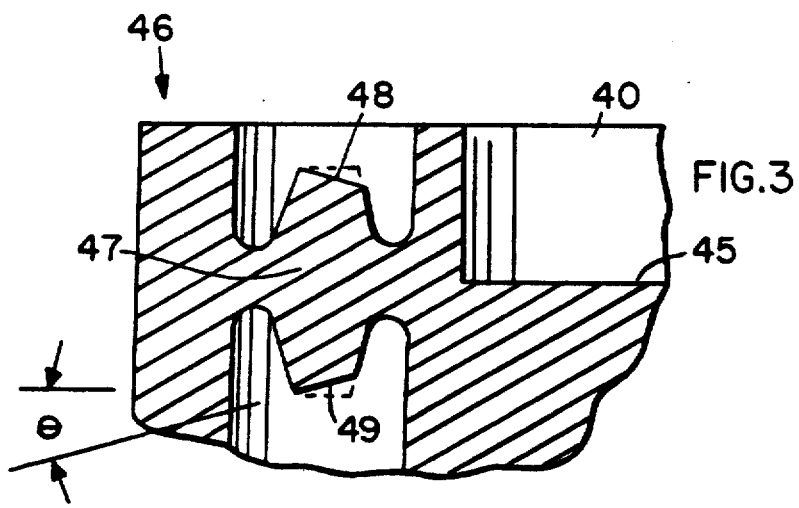
FIG.3
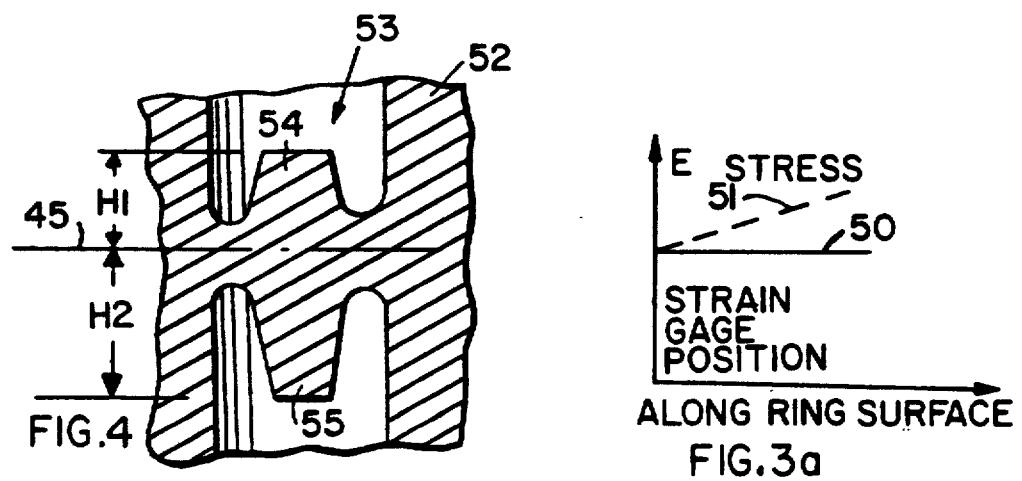
FIG.4
FIG.3a

000# TORSION RING TRANSDUCER

FIELD OF THE INVENTION

The invention relates to torsion ring force transducers which are used for measuring a force in a wide range of forces and for many purposes, e.g. in scales for weighing trucks and railroad cars, in high capacity process weighing, and in material testing equipment.

BACKGROUND INFORMATION

Transducers of the above type are generally described in an article entitled "New Developments in Force Measurement" by Joseph H. Antkowiak et al., published by Hottinger Baldwin Measurements, Inc., Marlboro, Mass., 01752. This type of transducer, due to its structure and function, has many advantages, for example, it is highly accurate, structurally it has a relatively low profile and permits practical load introduction techniques, while not requiring large moment supporting foundations. However, there is room for improvement, especially with regard to eliminating undesirable mounting effects, and effects caused by off-center load applications, and improved manufacturing costs.

U.S. Pat. No. 4,811,610 (Gassmann) describes a weighing cell quite similar to the transducer or load cell described in the above mentioned article. Gassmann wants to improve such transducers, especially with regard to their sensitivity to off-center load applications, and to mounting effects. In other words, Gassmann wants to make his load cells less sensitive to these phenomena. This aim is presumably achieved in the Gassman transducer by an especially small web thickness (t) relative to the axial heigh (h) of the sensing ring or deformation body which is connected by the webs on the radially inner side, to the force application body, and on the radially outer side to the ring housing of the transducer, and by the requirement of a narrow deep radial groove width (b) between the sensing ring and the ring housing. The groove width (b) is considered relative to the radial width (l) of the deformation body or sensing ring. The groove (b) must be deep to satisfy the requirement that the web thickness (t) is not more than one sixth of the height (h) of the sensing ring and the groove width (b) is not more than one third of the radial sensing ring width (l).

These limitations imposed by Gassmann are undesirable because even modern machine tools have difficulties in cutting such deep and narrow grooves due to required cutting tool dimensions, which normally do not permit boring such narrow deep axial grooves without special precautions and at economical cutting speeds.

Although Gassmann intended to virtually eliminate the effects of disturbing variables occurring during load introduction and in the mounting of the weighing cell, achieving such goals has been difficult in practice due to the limitations imposed by trying to solve the problem exclusively at the webs which mount the sensing ring to the housing. The invention is based on the recognition that modifications in the web and groove dimensions are limited in their isolating abilities due to the above mentioned machining problems.

Mounting effects or "variables" are influences that affect the measuring result so that consistently repeatable results are hard to obtain, if the same transducer model is mounted to different types of foundations or even if in the same type of mounting the several mounting screws are not tightened to the same extent, or if the mounting surfaces have different surface characteristics, e.g., different roughnesses and flatness.

OBJECTS OF THE INVENTION

In view of the above it is the aim of the invention to achieve the following objects singly or in combination:

to construct a transducer of the above type in such a way that the above mentioned mounting effects are substantially prevented from influencing the measuring results without reliance on specific web and groove dimensions;

to effectively isolate the sensing ring of a torsion ring transducer from its mounting base and not necessarily from its housing for assuring consistent measuring results;

to use a specially dimensioned isolating mounting cylinder for achieving consistently repeatable measuring results with transducers of the type described above, independently of the type of mounting conditions involved;

to construct such a transducer with a lower height or profile and so as to substantially reduce its weight compared to the weight of a conventional transducer of comparable load capacity;

to improve the off-center load application performance of such torsion ring type force transducers;

to provide for an equalization of tensile and compressive stresses in such transducers for still further improving the off-center load performance; and to construct the torsion ring transducer in such a way that it may be manufactured with ease on readily available machine tools with economical cutting speeds and without extraordinary cutting tool requirements.

SUMMARY OF THE INVENTION

The basic concept of the invention is realized in an isolating device between a transducer mounting base, on the one hand, and the transducer with its sensor ring for sensing deformations and its housing and load application body, on the other hand. The isolating device prevents extrinsic forces and mounting effects resulting from the mounting of the base to a support or foundation from reaching the sensing ring. Such prevention is desirable because these mounting effects and other extrinsic forces can no longer adversely influence the measuring results.

A preferred isolating device of the invention is an isolating ring cylinder having a special axial wall length and cylinder wall thickness as disclosed below. One end of the isolating ring cylinder is operatively connected to a mounting base while the other cylinder end is rigidly connected to the outer ring housing in which the sensing ring for sensing a load caused deformation, is held concentrically between the outer ring housing and an inner load application body by two annular webs, and wherein the isolating ring cylinder has an axial cylinder wall length $W_l$ and a radial cylinder wall thickness $W_t$ which are so selected that the ratio $W_l$ to $W_t$ is within a range having an upper limit sufficient to avoid buckling of said ring cylinder when a maximum permissible load, as determined by the load rating of the particular load cell, is applied to the load application body, and a lower limit which still substantially prevents mounting effects from reaching said sensing ring from said mounting base.

The main purpose of the isolating ring cylinder is to make sure that mounting effects caused by securing the mounting base of the transducer or load cell, to a support or foundation, cannot adversely affect the measuring results, so that consistently accurate results can be measured substantially independently of the type of mounting. The invention achieves this purpose in a surprisingly simple manner because the machining of the isolating ring cylinder is rather simple with conventional cutters at economical cutting speeds. This is so because narrow deep grooves are avoided and because the cutting tools have direct access to and substantial space next to the areas requiring machining, e.g. on the inside directly through a large hole in the base.

Additional advantages of the invention are a surprising weight reduction of up to 50% to 75% compared to conventional load cells having a comparable capacity rating, in combination with more accurate measuring results than were possible heretofore. The terminal nonlinearity is reduced from 0.02% to 0.006%. Hysteresis is reduced from 0.02% to 0.007%. The above weight reduction in combination with simpler machining requirements reduces manufacturing costs to a substantial degree. It is considered surprising that a less costly force measuring device can be more accurate than a substantially more expensive conventional load cell of the same load capacity.

BRIEF DESCRIPTION OF THE DRAWINGS

In order that the invention may be clearly understood, it will now be described, by way of example, with reference to the accompanying drawings, wherein:

FIG. 1 is a sectional view through a conventional ring transducer as disclosed in U.S. Pat. No. 4,811,610 (Gassmann);

FIG. 3 is a view similar to that of FIG. 2, partially broken away, to illustrate sensing ring surfaces modified according to the invention for an improved mounting of strain gages on these sensing ring surfaces;

FIG. 3a shows a diagram of the stress as a function of the position of the strain gages on the surfaces of the sensing ring according to FIG. 3, and on conventional surfaces; and FIG. 4 is a sectional view similar to that of FIG. 3, however, illustrating another modification in the construction of the sensing ring having sensing ring sections with different heights above and below a neutral plane.

DETAILED DESCRIPTION OF THE PRIOR ART

Figure 2:
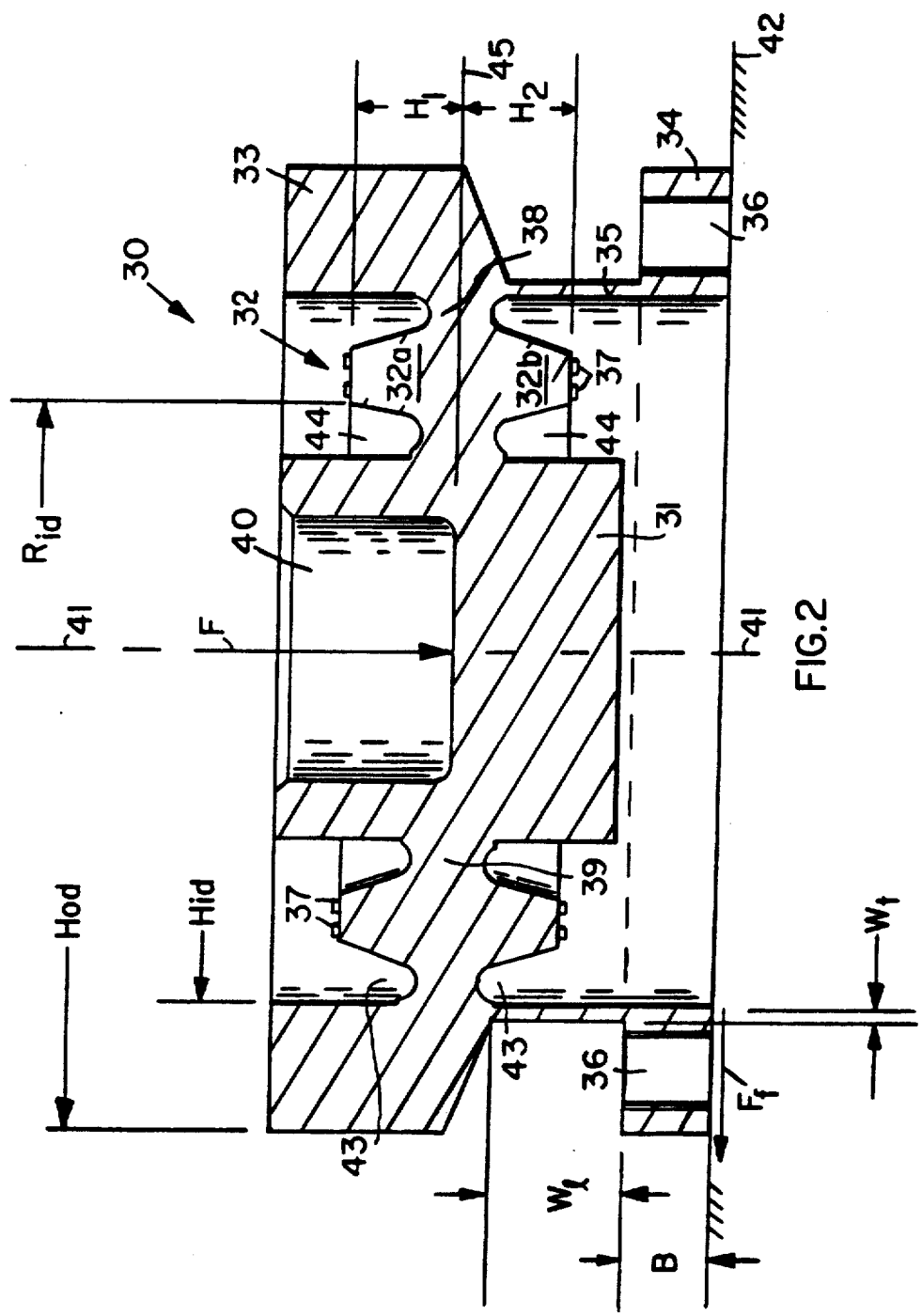
FIG. 2 is a sectional view similar to that of FIG. 1, however, showing a torsion ring transducer according to the invention.

FIG. 1 corresponds to FIG. 1 of U.S. Pat. No. 4,811,610 and shows a load or weighing cell 10 machined out of a one-piece cylindrical block to form a central force application element 11, an outer annular force take-up element 12 which also forms a housing, and an annular sensing ring or deformation body 13 arranged in the annular space between the central force introduction element 11 and the outer housing 12. A first radially inner force transmission web 14 connects the ring 13 to the central load application body 11. A second radially outer web 14' connects the sensing ring 13 to the housing 12. A central rotational axis 21' extends vertically through the load application body 11. A neutral plane 21 extends perpendicularly to the central axis 21' and centrally through the webs 14, 14'. An axially upwardly facing surface 19 of the sensing ring 13 carries strain gages 22. An axially downwardly facing surface 20 of the sensing ring 13 carries strain gages 23.

The force transmitting webs 14, 14' are formed by two radially outer grooves 15 and 16 and by two radially inner groves 17 and 18. The grooves 15 and 17 are open upwardly and the grooves 16 and 18 are open downwardly.

According to the Gassmann teaching, it is necessary that at least the radially outer grooves 15 and 16 are deep and narrow to achieve their isolating effect by providing at least the radially outer web 14' with an axial thickness (t) that is not more than one sixth of the height (h) of the sensing ring 13. Additionally, Gassmann imposes the limitation that the width of groove (b) of the webs in the radial direction which corresponds to the width of the grooves 15 and 16 in the radial direction, is at the most one third of the width (1) of the sensing ring 13 in the radial direction. These two requirements result in the above mentioned deep and narrow grooves, even if the shape of the ring 13 is modified.

DETAILED DESCRIPTION OF PREFERRED EXAMPLE EMBODIMENTS AND OF THE BEST MODE OF THE INVENTION

The invention is based on the recognition that isolating the sensing ring of the torsion ring transducer from its mounting need not be accomplished by special dimensions of the web that connects the sensing ring to its housing. Rather, the invention has found that a more efficient and more effective isolation can be accomplished by isolating the transducer housing from the mounting, as will now be described.

FIG. 2 shows a torsion ring transducer 30 having a load introduction body 31, a sensing ring 32, a ring housing 33, a mounting base 34, and an isolating device 35. Preferably, the isolating device 35 is a cylinder ring which effectively connects the base 34 to the ring housing 33, while simultaneously isolating the transducer structure, including its housing 33 from extraneous influences including particularly mounting effects when the base 34 is secured to a support 42, for example, by threaded bolts, not shown, extending into mounting holes 36 provided in the base 34.

The sensing ring 32 carries on its axially upwardly and axially downwardly facing surfaces strain gage elements 37. Additionally, the sensing ring 32 is connected to the ring housing 33 by a radially outer web 38. The sensing ring 32 is connected to the force introduction body 31 by a radially inner web 39. The force application body 31 is provided, for example, with a cavity 40 for introducing a force, said cavity 40 being arranged concentrically relative to a central rotational axis 41. A force F is introduced into the force application body 31 by a rod, not shown, inserted into the cavity 40. Instead of the force introducing cavity 40, the body 31 may be provided with a force introducing pin also arranged concentrically relative to the central rotational axis 41. Such a pin may, for example, have an outer threading for cooperation with a force applying device. In both cases, with the cavity and with the force application pin, the force F to be measured will be introduced as coaxially as possible relative to the central rotational axis 41 to minimize off-center load application effects.

It is the primary purpose of the invention to prevent extraneous forces, particularly mounting forces occurring when the base 34 is mounted to the support 42 from adversely influencing the deformation sensing ring 32 with its strain gages 37. This purpose is achieved in a surprisingly simple manner by the above mentioned isolating device 35 which is rigidly connected with its lower end to the base 34 and with its upper end to the ring housing 33. Preferably, the housing 33, the isolating device 35 in the form of a ring cylinder, and the base 34, as well as the body 31, the sensing ring 32, and the webs 38, 39 are formed as one integral structure from a respective cylindrical work piece by a relatively simple machining operation on a lathe type machine tool. According to the invention, the radially outer grooves 43 forming the web 38 and the radially inner grooves 44 forming the web 39 do not have to be particularly deep, nor do they have to be particularly narrow. Therefore, there is sufficient space for machining the radially inner surface of the isolating ring cylinder 35. Similarly, the radially outer surface of the cylinder 35 is also easily accessible to a respective machining tool.

The isolating ring cylinder 35 according to the invention has an axial wall length $W_l$ and a radial cylinder wall thickness $W_t$ which are so selected that the ratio of $W_l$ to $W_t$ is within a range having an upper limit sufficient to avoid buckling of the insulating ring cylinder 35 when the maximum permissible load or rated load capacity RC is applied. These dimensions $W_l$ and $W_t$ are further so selected that a lower limit will still substantially prevent mounting effects and extraneous forces from reaching the sensing ring.

It has been found that these dimensions $W_l$ and $W_t$ should be further selected so that the condition: $F_f < \mu \cdot RC$ is satisfied, wherein $F_f$ is a force sufficient for holding the mounting base 34 on the support 42 against slippage, wherein $\mu$ is a friction coefficient between the mounting base and the support, and wherein RC is the above mentioned rated maximum permissible load or rated load capacity. By satisfying this condition, it is assured that the base 34 does not slide relative to the support 42.

The following relationships exist for three practical embodiments made of steel with $\mu = 0.3$.

| RATED CAPACITY (RC) | $W_l/W_t$ | $F_f$ | $F_f/RC$ |
|---|---|---|---|
| 20k (20000 lbs., 9072 kg) | 7.5 | 5,050 lbs., 2291 kg | .2525 |
| 50k (50000 lbs., 22680 kg) | 10.7 | 8,330 lbs., 3778 kg | .1666 |
| 100k (100000 lbs., 45360 kg) | 4.924 | 20,650 lbs., 9367 kg | .2065 | where $F_f/RC$ should be equal to or less than $\mu$. A range of about four to about 15 for $W_l/W_t$ is practical.

Referring further to FIG. 2, the housing 33 has an outer housing ring diameter $H_{od}$ and an inner housing ring diameter $H_{id}$, while the mounting base 34 has a base height B. The just mentioned dimensions and the above mentioned axial cylinder wall length $W_l$ of the ring cylinder 35 are varied according to the invention by finite element analysis until the condition: $F_f < \mu \cdot RC$ is satisfied.

Further, the sensing ring 33 has an inner sensing ring diameter $R_{id}$ as well as an upper ring section 32a with an axial height $H_l$ and a lower sensing ring section 32b with an axial height $H_2$. The just mentioned dimensions $R_{id}$, $H_l$, and $H_2$ are also varied by finite element analysis until the above mentioned condition $F_f < \mu \cdot RC$ is satisfied. Incidentally, the division between the upper sensing ring section 32a and the lower ring section 32b is a neutral plane 45 extending perpendicularly to the central rotational axis 41 and centrally through the webs 38 and 39. Preferably, the load application cavity 40 extends down to the neutral plane 45.

The above mentioned axial length $W_l$ and the radial wall thickness $W_t$ of the isolating ring cylinder 35 are further so selected that $S_{max} < YP/4$, wherein $S_{max}$ is the maximum stress in the isolating ring cylinder 35 and YP is the yield point of the material of which the ring cylinder 35 is made. This feature has the purpose and advantage of allowing the highest degree of isolation without yielding of the material of which the transducer is made.

FIG. 3 shows a ring transducer 46 of the same construction as described above with reference to FIG. 2, including the isolating ring cylinder 35, however, with a modified sensing ring 47 having strain gage receiving surfaces 48 and 49 which are slanting at an angle $\theta$ to the horizontal and with a radially inward slant toward the neutral plane 45, whereby the transducer becomes less sensitive to off-center load applications. This improved characteristic is shown at 50 in FIG. 3a.

FIG. 3a shows that the slanting surfaces 48, 49 substantially make the transducer insensitive to the position of the strain gages along these slanting ring surfaces, as compared to the dashed characteristic 51 representing the strain gage receiving surfaces which extend radially as shown by respective dashed lines in FIG. 3. The origin of the coordinate system shown in FIG. 3a is assumed to coincide with a radially outer tip of the slanted surface 48 or 49. These slanted surfaces 48, 49 improve the off-center load performance of the present transducer even if, during manufacture, the strain gages 37 should not be placed completely accurately.

The angle $\theta$ is selected so that the transducer has a sensitivity substantially independent from the above position of the strain gages along the slanted ring surfaces. It has been found that an angle within the range of about 15° to about 25° achieves the desired result.

FIG. 4 shows an embodiment of a torsion ring transducer 52 in which the deformation sensing ring 53 has an upper ring section 54 and a lower ring section 55 relative to the neutral plane 45 with different axial heights $H_1$ and $H_2$. One of the ring sections, preferably the upper ring section, has a smaller height $H_1$ than the height $H_2$ of the lower ring section 55. This feature of the invention equalizes tensile and compressive strains occurring in the sensing ring when a load is applied to the load application body.

Although the invention has been described with reference to specific example embodiments, it will be appreciated, that it is intended to cover all modifications and equivalents within the scope of the appended claims.

What I claim is:

1. A torsion ring transducer for measuring forces within a rated load range having an upper load limit defined by a maximum permissible load, comprising a ring housing having a central rotational axis, a load application body arranged concentrically in said ring housing, a deformation sensing ring having surfaces for securing strain gage means to said sensing ring located concentrically between said ring housing and said load application body, a first ring web connecting said load application body to said deformation sensing ring, a second ring web connecting said deformation sensing ring to said ring housing, a mounting base for securing said ring transducer to a support, and mounting effect isolating means operatively connected at one end to said mounting base and at another end to said ring housing for substantially preventing mounting effects from reaching said sensing ring, wherein said mounting effect isolating means comprise an isolating ring cylinder rigidly connected at one end to said mounting base and at another end to said ring housing, said isolating ring cylinder having an axial cylinder wall length ($W_l$) and a radial cylinder wall thickness ($W_t$) which are so selected that the condition $F_f < \mu \cdot RC$ is satisfied, wherein $F_f$ is a force sufficient for holding said mounting base in place on a support, wherein $\mu$ is a friction coefficient between said mounting base and said support, and wherein RC is said rated maximum permissible load or rated capacity, and wherein the ratio of ($W_l$ to $W_t$) is within a range having an upper limit sufficient to avoid buckling of said isolating ring cylinder when said maximum permissible load is applied and a lower limit which still substantially prevents mounting effects from reaching said sensing ring.

2. The torsion ring transducer of claim 1, wherein said ring housing has an outer housing diameter $H_{od}$ and an inner housing diameter $H_{id}$, wherein said mounting base has a base height B, and wherein dimensional values for said axial cylinder wall length $W_l$ for said $H_{od}$, for said $H_{id}$, and for said B are varied by finite element analysis until said condition ($F_f < \mu \cdot RC$) is satisfied.

3. The torsion ring transducer of claim 2, wherein said sensing ring has an inner diameter $R_{id}$, and upper ring section above a neutral plane having a first ring section height $H_1$, and a lower ring section below said neutral plane having a second ring section height $H_2$, and wherein said $R_{id}$, said $H_1$, and said $H_2$, are also varied by finite element analysis until said condition $F_f < \mu \cdot RC$ is satisfied.

4. A torsion ring transducer of claim 1, wherein said isolating ring cylinder is so dimensioned as to its length $W_l$ and its wall thickness $W_t$ that the condition $S_{max} < YP/4$ is satisfied, wherein $S_{max}$ is the maximum stress in said isolating ring cylinder, and YP is the yield point of a material of which said isolating ring cylinder is made.

5. The torsion ring transducer of claim 1, wherein said load application body has a central load application cavity.

6. The torsion ring of claim 5, wherein said central load introduction cavity has a depth down to a neutral plane extending perpendicularly to said central rotational axis, said neutral plane also extending centrally through said first and second ring webs.

7. The torsion ring transducer of claim 1, wherein said deformation sensing ring comprises a neutral plane extending perpendicularly to said central rotational axis and centrally through said first and second ring webs, said sensing ring further having an upper sensing ring section and a lower sensing ring section above and below said neutral plane respectively.

8. The torsion ring transducer of claim 7, wherein one of said sensing ring sections is shorter than the other sensing ring section as viewed in the direction of said central rotational axis.

9. The torsion ring transducer of claim 8, wherein said upper sensing ring section is shorter than said lower sensing ring section for equalizing tensile and compressive strains occurring in said sensing ring when a load is applied to said load application body.

10. The torsion ring transducer of claim 7, wherein said surfaces for securing strain gage means to said sensing ring are ring surfaces of said upper and lower sensing ring sections, said ring surfaces slanting at an angle $\theta$ to the horizontal and with a radially inward slant toward said neutral plane, whereby said transducer is less sensitive to off-center load applications.

11. The torsion ring transducer of claim 10, wherein said angle $\theta$ is within the range of about 15° to about 25°.

12. The torsion ring transducer of claim 10, wherein said angle ($\theta$) is selected so that said transducer has a sensitivity substantially independent from a position of said strain gage means along said slanting ring surfaces.

13. The torsion ring transducer of claim 1, wherein said ratio $W_l/W_t$ is within the range of about 4 to about 15.

14. A torsion ring transducer for measuring forces within a rated load range having an upper load limit defined by a maximum permissible load, comprising a ring housing having a central rotational axis, a load application body arranged concentrically in said ring housing, a deformation sensing ring having surfaces for securing strain gage means to said sensing ring located concentrically between said ring housing and said load application body, a first ring web connecting said load application body to said deformation sensing ring, a second ring web connecting said deformation sensing ring to said ring housing, a mounting base for securing said ring transducer to a support, and mounting effect isolating means operatively connected at one end to said mounting base and at another end to said ring housing for substantially preventing mounting effects from reaching said sensing ring, wherein said mounting effect isolating means comprise an isolating ring cylinder rigidly connected at one end to said mounting base and at another end to said ring housing, said isolating ring cylinder having an axial cylinder wall length ($W_l$) and a radial cylinder wall thickness ($W_t$) which are so dimensioned that the condition $S_{max} < YP/4$ is satisfied, wherein $S_{max}$ is the maximum stress in said isolating ring cylinder, and YP is the yield point of a material of which said isolating ring cylinder is made, and wherein the ratio of ($W_l$ to $W_t$) is within a range having an upper limit sufficient to avoid buckling of said isolating ring cylinder when said maximum permissible load is applied and a lower limit which still substantially prevents mounting effects from reaching said sensing ring.

15. A torsion ring transducer for measuring forces within a rated load range having an upper load limit defined by a maximum permissible load, comprising a ring housing having a central rotational axis, a load application body arranged concentrically in said ring housing, a deformation sensing ring having surfaces for securing strain gage means to said sensing ring located concentrically between said ring housing and said load application body, a first ring web connecting said load application body to said deformation sensing ring, a second ring web connecting said deformation sensing ring to said ring housing, a mounting base for securing said ring transducer to a support, and mounting effect isolating means operatively connected at one end to said mounting base and at another end to said ring housing for substantially preventing mounting effects from reaching said sensing ring, wherein said load application body has a central load introduction cavity, and wherein said central load introduction cavity has a depth down to a neutral plane extending perpendicularly to said central rotational axis, said neutral plane also extending centrally through said first and second ring webs.

16. A torsion ring transducer for measuring forces within a rated load range having an upper load limit defined by a maximum permissible load, comprising a ring housing having a central rotational axis, a load application body arranged concentrically in said ring housing, a deformation sensing ring having surfaces for securing strain gage means to said sensing ring located concentrically between said ring housing and said load application body, a first ring web connecting said load application body to said deformation sensing ring, a second ring web connecting said deformation sensing ring to said ring housing, a mounting base for securing said ring transducer to a support, and mounting effect isolating means operatively connected at one end to said mounting base and at another end to said ring housing for substantially preventing mounting effects from reaching said sensing ring, wherein said deformation sensing ring comprises a neutral plane extending perpendicularly to said central rotational axis and centrally through said first and second ring webs, said sensing ring further having an upper sensing ring section and a lower sensing ring section above and below said neutral plane, respectively, and wherein said surfaces for securing strain gage means to said sensing ring are ring surfaces of said upper and lower sensing ring sections, said ring surfaces slanting at an angle $\theta$ to the horizontal and with a radially inward slant toward said neutral plane, whereby said transducer is less sensitive to off-center load applications.

17. The torsion ring transducer of claim 16, wherein one of said sensing ring sections is shorter than the other sensing ring section as viewed in the direction of said central rotational axis.

18. The torsion ring transducer of claim 17, wherein said upper sensing ring section is shorter than said lower sensing ring section for equalizing tensile and compressive strains occurring in said sensing ring when a load is applied to said load application body.

19. The torsion ring transducer of claim 16, wherein said angle $\theta$ is within the range of about 15° to about 25°.

20. The torsion ring transducer of claim 16, wherein said angle $\theta$ is selected so that said transducer has a sensitivity substantially independent from a position of said strain gage means along said slanting ring surfaces.

* * * * *